United States Patent [19]
Ueno et al.

[11] 3,721,667
[45] March 20, 1973

[54] NOVEL ANTIBACTERIAL COMPOUNDS AND A PROCESS FOR THE PREPARATION OF THE SAME

[75] Inventors: Saburo Ueno; Etsuzo Shimogo; Takao Kawasaki; Daisaku Inmaru; Fumio Hirose; Satoshi Heya; Yoshio Omura; Yoshiaki Osaka; Takayoshi Fujii; Osamu Otake, all of Tokyo, Japan

[73] Assignee: Kureha Kagaku Kogyo Kabushiki Kaisha, Tokyo, Japan

[22] Filed: May 26, 1970

[21] Appl. No.: 40,733

[30] Foreign Application Priority Data

May 30, 1969 Japan..................44/42331
May 30, 1969 Japan..................44/42332

[52] U.S. Cl. ................260/240 A, 99/2 M, 424/270, 424/272
[51] Int. Cl. ........................C07d 85/48, C07d 91/42
[58] Field of Search..................260/240 A

[56] References Cited

UNITED STATES PATENTS 3,491,091  1/1970  Berger et al.................260/240 A

FOREIGN PATENTS OR APPLICATIONS 5,032  4/1964  Japan.................260/240 A

OTHER PUBLICATIONS

Chemical Abstracts, Vol. 70, Cols. 1 and 2 of page 340 (abstract no. 77845g), Apr. 28, 1969.

*Primary Examiner*—John D. Randolph
*Attorney*—Sughrue, Rothwell Mion, Zinn & Macpeak

[57] ABSTRACT

There are described new chemical compounds, or more specifically 1-(5-nitrofuryl)-2-(2-cyclohexenoazolyl)-ethylene of the following formula:

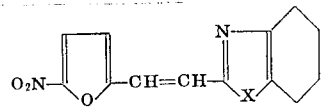

wherein X is a member selected from the group consisting of oxygen and sulfur.
and a method for the preparation of the same, as well as compositions containing the same.

These new compounds represent superior antibacterial properties and a low mammalian toxicity, and are not subjected to inactivation in medium. The method for the preparation thereof comprises: reacting a compound selected from the group consisting of 2-methyl-cyclohexeno-oxazole and 2-methyl-cyclohexeno-thiazole with a compound selected from the group consisting of 5-nitro-furfural and the diacetate thereof.

3 Claims, No Drawings

NOVEL ANTIBACTERIAL COMPOUNDS AND A PROCESS FOR THE PREPARATION OF THE SAME

This invention relates to new chemical compounds, or more specifically 1-(5-nitrofuryl)-2-(2-cyclohexenoazolyl)-ethylene of the following formula:

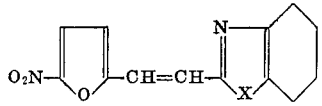

wherein X is a member selected from the group consisting of oxygen and sulfur.
and a method for the preparation of the same, as well as compositions containing the same.

As referred to above, the member X be oxygen or shlfur. In the former case, the compound is cyclohexenooxazole and in the latter case, it corresponds to 2-(5-nitrofurylvinyl)-cyclohexenothiazol.

These new compounds represent superior antibacterial properties and a low mammalian toxicity and are not subjected to inactivation in medium, thus the compounds being highly effective as antimicrobial agent and further find various application possibilities in the fields of medicines, food preservatives, antiseptics and the like.

As known structurally similar compounds to the novel nitrofuran derivatives, may be, among others referred to 2-[2-(5-nitrofuryl)-vinyl] -5-methyloxazole and 2-[2-(5nitrofuryl)vinyl]vinyl] -4-methylthiazole (cf. German patent specification No. 1,445,660).

Although the novel nitrofuran derivatives have somewhat similar antimicrobial properties to said known prior compounds, they are characterized by substantially no inactivation in vivo and appreciably lower mammalian toxicity, these superior and favorable properties having hitherto been not found among the known nitrofurans. As an example, the novel compounds according to this invention efficiently inhibit the growth of such microbes as Bacillus subtilis, B. mycoides and Staphylococcus aureus in bouillon at a concentration of 0.1 to 1.0 ppm of the effective substance and the value of the minimum inhibitory concentration is not affected by the presence of ferrous ions, SH-compouns such as systein and/or protein which are well known as inactivating components of food stuffs against nitrofurans. It will be seen thus the novel compounds according to the invention are not suffered from the inactivation by these substances.

The low mammalian toxicity of the new compounds according to this invention may be demonstrated by the fact that the value of acute oral LD 50 of 1-(5-nitrofuryl)-2-(2-cyclohexenothiazolyl)-ethylene is higher than 25,000 mg/kg of body weight of mouse as compared with 2,000 mg/kg of that of any of the aforementioned nitrofurans of similar chemical structure, or more specifically, 2-[2-(5-nitrofuryl)-vinyl]-5-methyloxazole and 2-[2-(5-nitrofuryl)-vinyl] -4-methylthiazole. Therefore, it can be generally said that the novel compounds have a 10–12 times lower toxicity than that of the comparative conventional substances, showing thus a high degree of safety in use.

The superior performance of the novel compounds concerning chronic toxicity can be representatively seen from the following observation that when rats were fed for 3 or 6 months, as the case may be, with a daily diet containing 0.2 wt. % of 1-(5-nitrofuryl)-2-(2-cyclohexeno-azolyl)-ethylene, there was substantially no appreciable change of the body weights, the rate of growth, the behaviors and the weights of organs of the tested rats, as compared with controls, and that in this case, no appreciable hazard was observed in a systematic and pathological examination of the animal organs, as well as haematological urine examination.

Because of the absence of inactivation in vivo of the low toxicities as will be more specifically demonstrated in the following examples, the novel compounds according to this invention are highly useful as antimicrobials, and they are also highly safe even in the case of continuous administration, especially as preservatives and antiseptics for pet foods. As pet foods contain normally plenty of beast organ components such as those of liver, lung, bones and intestines as their constituents and include 30 to 70 wt. % of water, they will become spoiled due to putrefaction more readily than other kinds of pet food, and it is very difficult to prevent the spoilage even by use of conventional nitrofurans due to the possible inactivation in vivo of such nitrofuran. As an example, an addition of 20 ppm of 5-nitrofurfural semi-carbazone to pet foods provided substantially no preservative effect which means that the compound under consideration is not suitable for pet food preservation purpose.

On the contrary, when one of the novel compounds according to this invention is added to pet foods at the same dose of 20 ppm, the foods were preserved for 14 days without any spoilage thereof, while they became completely spoiled if no preservative were added. When 2,000 ppm of sorbic acid as preservative to pet foods, they were collapsed only after 7 days.

The preservative effect of the novel compounds according to the present invention on pet foods may be still enhanced to 30–40 days of preservation by simultaneous addition of conventional preservative sorbic acid as will be shown in Example 4 hereinafter. The compounds of the present invention are prepared by condensation reaction of 5-nitrofurfural or its diacetate with 2-methylcylohexeno-azole such as -oxazole or -thiazole in a suitable solvent such as acetic acid or acetic anhydride, preferably, in the presence or absence of a proper catalyst such as hydrochloric acid, sulfuric acid, anhydrous zinc chloride and/or piperidine, preferably in acetic anhydride at a temperature around the boiling point of the solvent in a relatively long period of reaction. The thus obtained novel compounds may be used in the form of a composition consisting preferably 2–10 wt. % of said compound well mixed with conventional fillers such as starch and lactose which do not react with said compound, the composition being formulated normally as powders and granules.

EXAMPLE 1

Preparation of 1-(5-nitrofuryl)-2-(2-cyclohexeno-oxazolyl)-ethylene 1.4 grams of 5-nitrofurfural and 1.5 grams of 2-methyl-cyclohexenooazazole were dissolved in 9.8 grams of acetic anhydride. The solution was heated for 5 hours at 130°C under agitation. After completion of the reaction, the mixture was cooled and the thus formed raw crystals were separated.

After filtering and recrystallizing the raw crystals from benzene one gram of yellow needles melting at 198°C was obtained as the final product.

EXAMPLE 2

Preparation of 1-(5-nitrofuryl)-2-(2-cyclo hexenothiazolyl)-ethylene

A mixture of 2.5 grams of 5-nitrofurfural, 2.5 grams of 2-methylcylclohexenothiazole and 25 grams of acetic anhydride was heated for 8 hours at a temperature between 120° and 130°C.

After cooling and filtering of the reaction mixture, the separated raw crystals were recrystallized from benzene to obtain 1.3 grams of yellow needles melting at 190°C as the final product.

EXAMPLE 3

Fish-meat sausage

To a mixed meat consisting of 1,200 grams of whale meat, 400 grams of big-eye tuna meat and 400 grams of Alaskan pollack meat, 200 grams of lard, 200 grams of starch, 500 grams of water, 60 grams of common salt and a calculated amount of 1-(5-nitrofuryl)-2-(2-cyclohexeno-oxazolyl)-ethylene (called A-substance) or 1-(5-nitro furyl)-2-(2-cyclohexenothiazolyl)-ethylene (called B-substance), respectively so as to set the average concentration of said compound to 20 ppm of the whole mass were added. The whole mass was processed to a ground fish meat and was filled-up in casings made of vinylidence chloride-vinyl chloride copolymer. The thus filled-up casings were sealed off and pasteurized by heating for 60 minutes at 85°C to make fish-meat sausages. These sausages were kept at 37°C for 35 days. The results of observation of the spoilage of the sausage during the 35 days were as follows:

The cumulative number of the spoiled sausages vs. the total number of the tested sausages at the indicated date of observation.

| Days of keeping: | 7 | 14 | 21 | 28 | 35 |
|---|---|---|---|---|---|
| Preservative: | | | | | |
| A-substance: | 0/20 | | 0/20 | 0/20 | 0/20 |
| B-substance: | 0/20 | 0/20 | 0/20 | 0/20 | 1/20 |
| Nothing added: | 20/20 | | not observed | | |

EXAMPLE 4

1,000 grams of beef were cured with 30 grams of common salt and 0.2 gram of sodium nitrite. 1,000 grams of cattle liver were cured with 30 grams of common salt, 0.2 gram of sodium nitrite and 0.3 gram of potassium bromate. 1,000 grams of crushed cattle bones were cured with 0.3 gram of potassium bromate. The period of curing amounted to 2 days at 5°C. Then the above-mentioned three components were cut into small pieces, mixed well and ground so as to form a mixed ground meat. Each calculated amount of one of the compound of the present invention and concentration became 20 ppm and 2,000 ppm, respectively, of the product or a pet food.

500 grams of starch, 500 grams of soybean protein and 1,000 grams of water were further added to the ground meat and the whole mass was mixed together and kneaded thoroughly, then filled into several casings made of vinylidene chloride-vinyl chloride copolymer. The thus filled-up casings were sealed and pasteurized by heating at 87° C for 60 minutes to provide pet food packages. They were kept at 30°C for 35 days during which the spoilage of the pet food was observed. The results were as follows:

The cumulative number of spoiled pet food vs. the total number of the tested pet food at the indicated data of observation.

| Date of observation: | 2 | 7 | 14 | 21 | 28 | 35 |
|---|---|---|---|---|---|---|
| those added nothing: | 20/20 | | | | | |
| Those added only with A-substance: | 0/20 | 0/20 | 0/20 | 5/20 | 8/20 | 10/20 |
| Those added only with B-substance: | 0/20 | 0/20 | 0/20 | 6/20 | 10/20 | 12/20 |
| Those added only with sorbic acid: | 0/20 | 10/20 | 20/20 | | | |
| Those added with A-substance and sorbic acid: | 0/20 | 0/20 | 0/20 | 1/20 | 1/20 | 1/20 |
| Those added with B-substance and sorbic acid: | 0/20 | 0/20 | 0/20 | 2/20 | 2/20 | 2/20 |

A-substance: 1-(5-nitro furyl)-2-(2-cyclohexeno-oxazolyl)-ethylene
B-substance: 1=(5-nitro furyl)-2-(2-cyclohexeno-thiaolyl)-ethylene

EXAMPLE 5

To 2 grams of finely pulverized 1-(5-nitro furyl)-2-(2-cyclohexeno-thiazolyl)-ethylene of average size of 1-10 microns, 48 grams of lactose (passed through a 100-mesh sieve), 0.03 gram of sodium CMC, 0.02 grams of "Tween 80" (an emulsifier) were mixed. After adding 8 grams of water the whole mass was well kneaded and pressured on a sieve of 30 mesh to obtain wet granules. The granules were heated for about 2 hours at 40°C and then sifted with a sieve of 30 mesh to obtain 40 grams of dried granules containing 2 wt.% of the active ingredient or more specifically 1-(5-nitrofuryl)-2- (2-cyclohexeno-thiazolyl)-ethylene.

EXAMPLE 6

Main chemical and physical data of 1-(5-nitrofuryl)-2-(2-cyclohexeno-oxazolyl)-ethylene, are as follows:

| Molecular weight: | |
|---|---|
| theoretical: | 260.2; |
| found: | 258.6; |
| Elementary analysis: | |
| theoretical as $C_{13}H_{12}N_2O_4$ | C: 60.0; |
| | H: 4.61; |
| | N: 10.76; |
| found: | C: 60.17; |
| | H: 4.35; |
| | N: 10.01; |
| Melting point: | 198°C; |
| Appearance: | Yellow needle; |

EXAMPLE 7

Main chemical and physical data of 1-(5-nitrofuryl)-2-cyclohexeno-thiazolyl)-ethylene are as follows:

| Molecular weight: | |
|---|---|
| theoretical: | 276.2; |
| found: | 275.6; |
| Elementary analysis: | |
| theoretical as $C_{13}H_{12}N_2O_3S$: | C: 56.5; |
| | H: 4.35; |
| | N: 10.14; |
| | S: 11.59; |
| found: | C: 56.60; |
| | H: 4.24; |
| | N: 10.01; | found: S: 11.42;
Absorption maximum:
UV: 407 mμ
Melting point: 190°C
Appearance: yellow needle.

The embodiments of the invention in which an exclusive property or privilege is claimed are as follows:

1. 1-(5-nitro furyl)-2-(2-cyclohexeno-azolyl)-ethylene compounds of the formula:

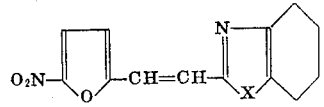

wherein X is a member selected from the group consisting of oxygen and sulphur.

2. The compound of claim 1:
1-(5-nitrofuryl)-2-(2-cyclohexeno-oxazolyl)-ethylene.

3. The compound of claim 1:
1-(5-nitrofuryl)-2-(2-cyclohexeno-thiazolyl)-ethylene.

* * * * *